United States Patent
Floyd et al.

(10) Patent No.: US 6,745,321 B1
(45) Date of Patent: Jun. 1, 2004

(54) METHOD AND APPARATUS FOR HARVESTING PROBLEMATIC CODE SECTIONS AGGRAVATING HARDWARE DESIGN FLAWS IN A MICROPROCESSOR

(75) Inventors: Michael Stephen Floyd, Leander, TX (US); Kevin Franklin Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,104

(22) Filed: Nov. 8, 1999

(51) Int. Cl.$^7$ ................................. G06F 11/22
(52) U.S. Cl. ................ 712/227; 714/45; 714/39; 710/267
(58) Field of Search ............... 714/51, 45, 39; 712/228, 227, 219; 710/267

(56) References Cited

U.S. PATENT DOCUMENTS

| | | | | |
|---|---|---|---|---|
| 3,518,413 A | * | 6/1970 | Holtey | 714/51 |
| 3,566,368 A | * | 2/1971 | De Blauw | 714/51 |
| 5,448,705 A | * | 9/1995 | Nguyen et al. | 712/228 |
| 5,560,033 A | * | 9/1996 | Doherty et al. | 713/340 |
| 5,668,815 A | * | 9/1997 | Gittinger et al. | 714/720 |
| 5,701,516 A | * | 12/1997 | Cheng et al. | 710/22 |
| 5,790,530 A | * | 8/1998 | Moh et al. | 370/363 |
| 6,269,478 B1 | * | 7/2001 | Lautenbach-Lampe et al. | 717/127 |
| 6,539,500 B1 | * | 3/2003 | Kahle et al. | 714/45 |

OTHER PUBLICATIONS

Hennessy, John L. and David A. Patterson, Computer Architecture A Quantitative Approach, 1996, Morgan Kaufmann Publishers, Inc., 2nd Ed., pp. 179–184.*

* cited by examiner

Primary Examiner—Richard L. Ellis
Assistant Examiner—Tonia L. Meonske
(74) Attorney, Agent, or Firm—Duke W. Yee; Volel Emile; Stephen J. Walder, Jr.

(57) ABSTRACT

A method and apparatus for harvesting problematic code sections that may cause a hang condition based on a hardware design flaw is presented. Monitoring is performed to detect a hang condition. Responsive to detecting a hang condition, steps are employed by hardware and/or software to recover from a hang condition, such as flushing instructions dispatched to the plurality of execution units. Upon successful completion of hang recovery, a debug interrupt is injected, causing a debug interrupt handler to be immediately involved before the resumption of normal execution. The debug interrupt handler may then harvest problematic code sections in the undisturbed execution error that may have caused the hang condition.

30 Claims, 4 Drawing Sheets

METHOD AND APPARATUS FOR HARVESTING PROBLEMATIC CODE SECTIONS AGGRAVATING HARDWARE DESIGN FLAWS IN A MICROPROCESSOR

CROSS-REFERENCE TO RELATED APPLICATIONS

The present invention is related to the following application entitled "METHOD AND APPARATUS FOR MULTI-STAGE HANG RECOVERY IN AN OUT-OF-ORDER MICROPROCESSOR", U.S. application Ser. No. 09/436,106, filed on Nov. 8, 1999, now U.S. Pat. No. 6,543,003; which is assigned to the same assignee.

BACKGROUND OF THE INVENTION

1. Technical Field

The present invention relates generally to an improved data processing system and, in particular, to a method and apparatus for instruction processing architecture and instruction processing control within a processor in a data processing system, and more particularly, processing control with specialized instruction processing in support of testing and debugging.

2. Description of Related Art

Modern processors commonly use a technique known as pipelining to improve performance. Pipelining is an instruction execution technique that is analogous to an assembly line. Instruction execution often involves the sequential steps of fetching the instruction from memory, decoding the instruction into its respective operation and operand(s), fetching the operands of the instruction, applying the decoded operation on the operands (herein simply referred to as "executing" the instruction), and storing the result back in memory or in a register. Pipelining is a technique wherein the sequential steps of the execution process are overlapped for a subsequence of the instructions. For example, while the CPU is storing the results of a first instruction of an instruction sequence, the CPU simultaneously executes the second instruction of the sequence, fetches the operands of the third instruction of the sequence, decodes the fourth instruction of the sequence, and fetches the fifth instruction of the sequence. Pipelining can thus decrease the execution time for a sequence of instructions.

Another technique for improving performance involves executing two or more instructions in parallel, i.e., simultaneously. Processors that utilize this technique are generally referred to as superscalar processors. Such processors may incorporate an additional technique in which a sequence of instructions may be executed out of order. Results for such instructions must be reassembled upon instruction completion such that the sequential program order or results are maintained. This system is referred to as out of order issue with in-order completion.

The ability of a superscalar processor to execute two or more instructions simultaneously depends upon the particular instructions being executed. Likewise, the flexibility in issuing or completing instructions out-of-order can depend on the particular instructions to be issued or completed. There are three types of such instruction dependencies, which are referred to as: resource conflicts, procedural dependencies, and data dependencies. Resource conflicts occur when two instructions executing in parallel tend to access the same resource, e.g., the system bus. Data dependencies occur when the completion of a first instruction changes the value stored in a register or memory, which is later accessed by a later completed second instruction.

During execution of instructions, an instruction sequence may fail to execute properly or to yield the correct results for a number of different reasons. For example, a failure may occur when a certain event or sequence of events occurs in a manner not expected by the designer. Further, an error also may be caused by a misdesigned circuit or logic equation. Due to the complexity of designing an out of order processor, the processor design may logically mis-process one instruction in combination with another instruction, causing an error. In some cases, a selected frequency, voltage, or type of noise may cause an error in execution because of a circuit not behaving as designed. Errors such as these often cause the scheduler in the microprocessor to "hang", resulting in execution of instructions coming to a halt.

Therefore, it would be advantageous to have a method and apparatus for recovering from errors causing a microprocessor to hang. It would be particularly advantageous to provide contextual information with respect to the cause of an error.

SUMMARY OF THE INVENTION

A method and apparatus for harvesting problematic code sections that may cause a hang condition based on a hardware design flaw is presented. Monitoring is performed to detect a hang condition. Responsive to detecting a hang condition, steps are employed by hardware and/or software to recover from a hang condition, such as flushing instructions dispatched to the plurality of execution units. Upon successful completion of hang recovery, a debug interrupt is injected, causing a debug interrupt handler to be immediately invoked before the resumption of normal execution. The debug interrupt handler may then harvest problematic code sections in the undisturbed execution environment to allow diagnosis of the hardware design error that may have caused the hang condition.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
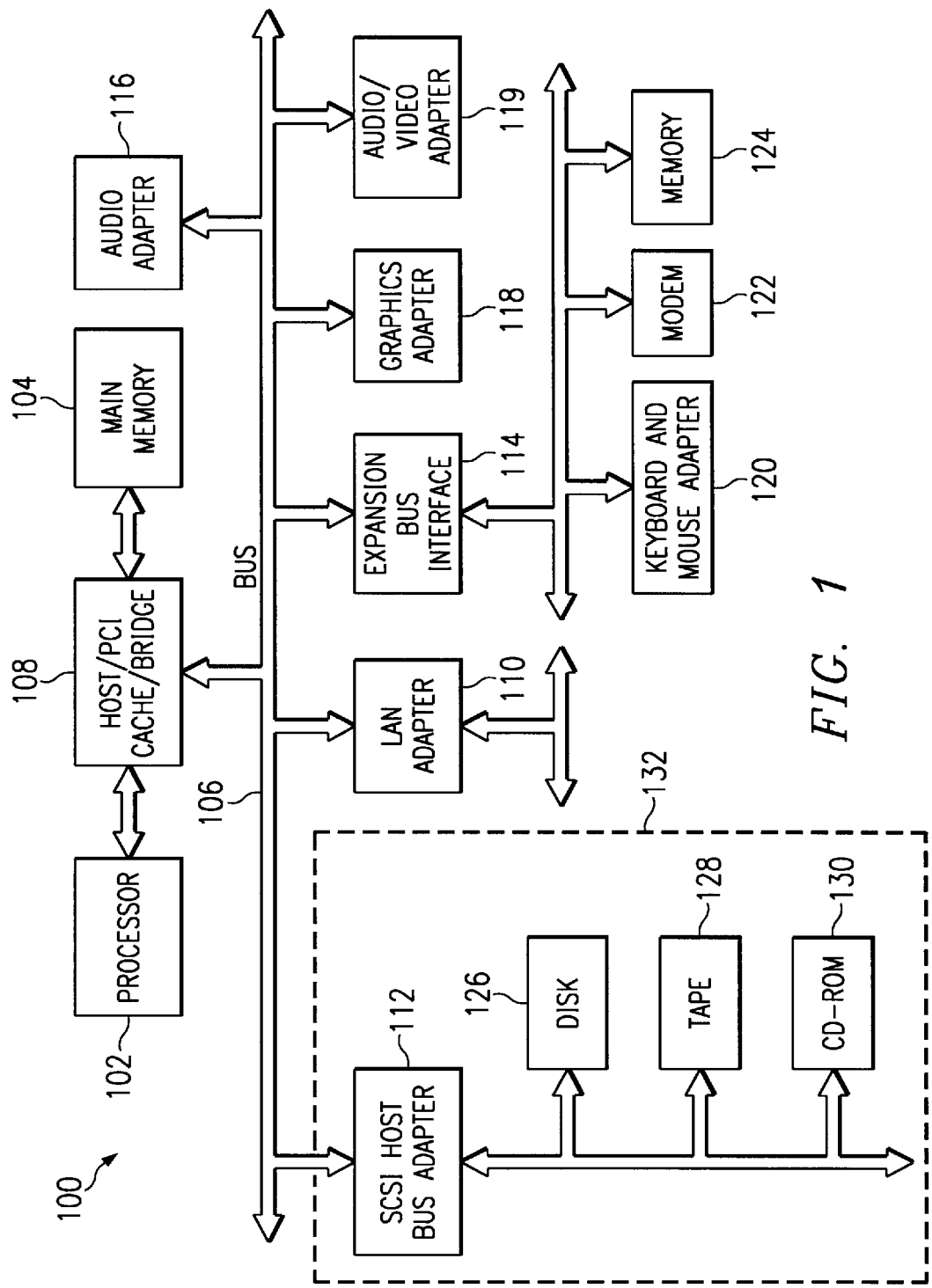
FIG. 1 is a block diagram of a data processing system in which the present invention may be implemented.

With reference now to FIG. 1, a block diagram illustrates a data processing system in which the present invention may be implemented. Data processing system 100 is an example of a client computer. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as AIX (Advanced Interactive executive), which is available from International Business Machines Corporation. Instructions for the operating system and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. The data processing system depicted in FIG. 1 may be, for example, an IBM RISC/System 6000 system, a product of International Business Machines Corporation in Armonk, N.Y., running the Advanced Interactive Executive (AIX) operating system.

The depicted examples in FIG. 1 are not meant to imply architectural limitations. In particular, the mechanism of the present invention may be implemented within processor 102. Specifically, the mechanism of the present invention is particularly suited for use in a superscalar processor.

Prior to operating, the present invention uses a method and apparatus for hang recovery that handles hang states that freeze the instruction sequencing or instruction execution within a processor core. The hang recovery may work as follows. A mechanism having hooks or connections into the core may flush the currently processed instruction stream. When a flush occurs, instructions currently being processed by execution units are canceled or thrown away. In other words, "flush" means to "cancel" or throw away the effect of the instruction being executed. Then, execution of the instructions are restarted. The flush operation may be implemented by using currently available flush mechanisms for processor cores currently implemented to back out of mispredicted branch paths. During certain windows of time, a particular instruction sequence may fail. If this stream of instructions is flushed and re-executed, the sequence may execute flawlessly on the second attempt.

Further, during the hang recovery process, the behavior of a processor may be changed. For example, the mechanism of the present invention may change the processor from executing instructions out of order to executing instructions in order, also referred to as a "single issue" mode. Also, the processor may be changed to process one instruction per group of execution means. In this case, the processor no longer operates in a superscalar mode. A further mode of operation may include flushing and re-fetching after every group of instructions to slow down instruction throughput. Re-executing the code sequence with a different execution order for the group as it flows through the processor may allow the code stream to execute flawlessly on the second attempt. These behavioral changes effectively reduce the performance or throughput of the processor in an attempt to avoid the exact instruction timing that exposes the flaw causing the processor to hang. After a programmable number of instruction/group completions, the processor may be returned back to full-speed operation for performance.

The present invention recognizes that the context in which a hang error occurs may change significantly if the recovery process progresses towards full operation of the system, i.e., further than the hang condition detection and recovery alone. If the system were to reach full operation, the error-causing context may be only partially retrievable or recreatable but may not be analyzable at all. The present invention attempts to intervene as soon as possible after a successful but minimally invasive hang recovery process in order to gather contextual information concerning the instructions that were executing immediately before the hang condition occurred. FIGS. 2–5 illustrate a hang detection and recovery process that may be used prior to initiating the interrupt process of the present invention.

Figure 2:
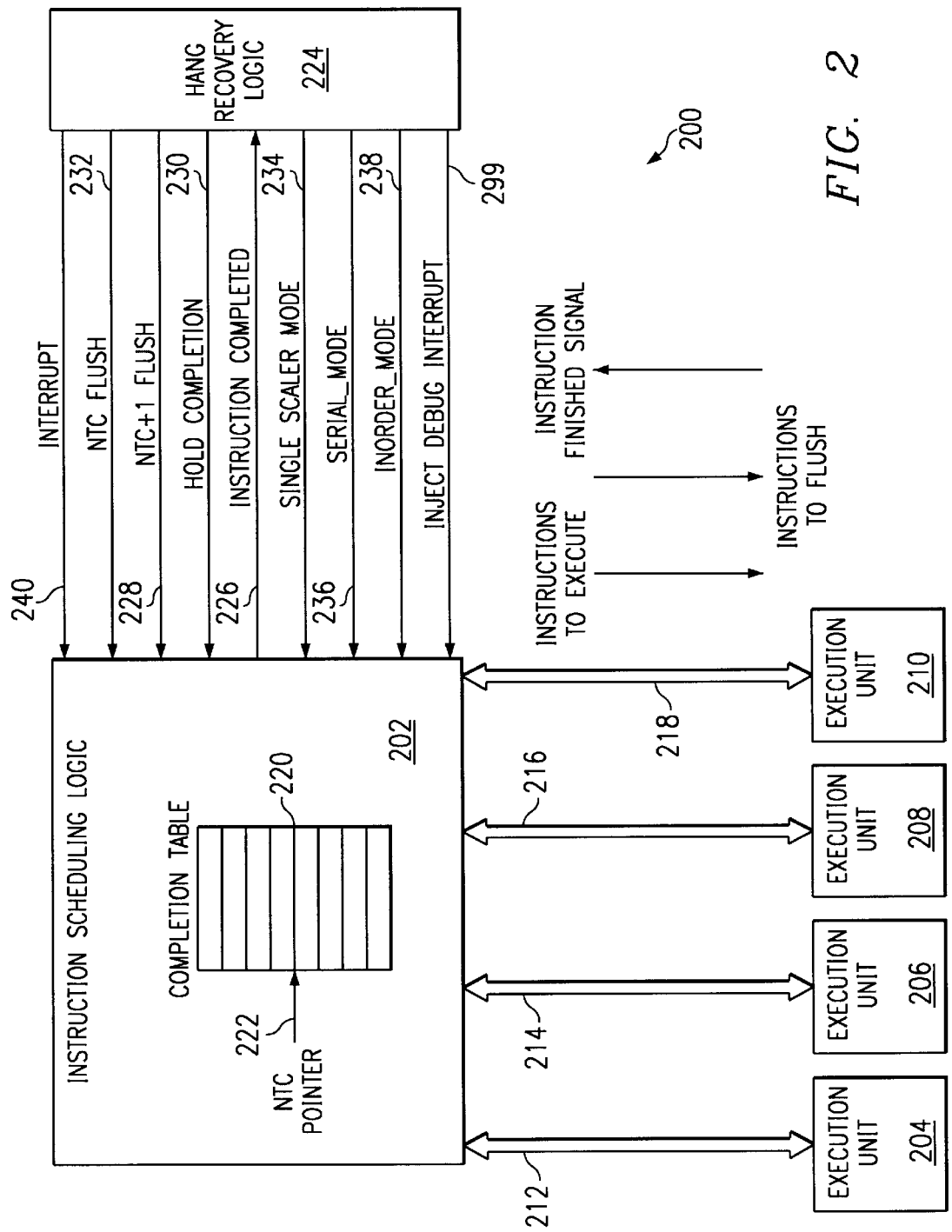
FIG. 2 is a diagram of a portion of a processor core depicted in accordance with a preferred embodiment of the present invention.

With reference next to FIG. 2, a diagram of a portion of a processor core is depicted in accordance with a preferred embodiment of the present invention. Section 200 illustrates a portion of a processor core for a processor, such as processor 102 in FIG. 1. Only the components needed to illustrate the present invention are shown in section 200. Other components are omitted in order to avoid obscuring the invention.

In section 200, instruction scheduling logic 202 schedules and dispatches instructions to execution units 204, 206, 208, and 210. Instruction scheduling logic 202 may also be referred to as an instruction dispatcher. Execution units 204, 206, 208, and 210 include execution units, such as fixed point units (FXUs), floating point units (FPUs), and load/store units (LSUs). Of course, these execution units may include other types of execution units depending on the implementation. Only four execution units are shown for the purpose of illustration and other numbers of execution units of the types mentioned are present for superscalar processing.

Instruction scheduling logic 202 communicates with execution units 204, 206, 208, and 210. In general, instruction scheduling logic 202 is able to send instructions present in that execution unit via buses 212, 214, 216, and 218. In response, an execution unit may return an instruction finished signal to indicate when an execution of an instruction has been completed. Completion of execution of these instructions are tracked by instruction scheduling logic 202 in completion table 220 using next to complete (NTC) pointer 222. This pointer points to the instruction that is next to be completed.

Hang recovery logic 224 is coupled to instruction scheduling logic 202 to provide a hang recovery mechanism. Hang recovery logic 224 receives signals indicating instruction completion through line 226. Instruction scheduling logic 202 will send an instruction completion signal each time an instruction has completed. This signal is used by hang recovery logic 224 to determine whether a hang situation has occurred. If instruction scheduling logic 202 hangs, various signals may be sent to provide hang recovery. The hang of the processor core is sometimes located in the instruction scheduling logic and other times may be in the execution unit itself. When the execution unit hangs, the instruction scheduling logic fails to receive an instruction finish signal from the execution unit, and thus the instruction scheduling logic stops making forward progress in issuing or completing instructions.

In this example, a NTC+1 flush signal may be sent on line 228 as a low priority flush attempt in response to a hang condition in the processor core. A NTC flush signal may be sent on line 232 to perform a high priority flush attempt if the first hang recovery attempt did not break the hang. A hold completion signal may be sent on line 230 to instruction scheduling logic 202. In some implementations, it may be necessary to momentarily hold the dispatch of instructions and/or the completion of instructions during the flush operation in order to prevent confusing instruction scheduling logic 202. The hold completion signal stops completion of instructions during the flush operation.

The mode of processor performance may be changed using hang recovery logic 224. In these examples, the mode is changed through lines 234, 236, and 238, which are used to implement a single scalar mode, a serial mode, and an in-order mode in these examples. Further, an interrupt may be generated across line 240 to allow software intervention to clean up the hang condition. This software recovery may include, for example, terminating the process that contained the problem code stream that caused the hang without crashing the entire system.

Hang recovery logic 224 may send inject debug interrupt signal 299 to instruction scheduling logic 202 upon the successful detection and commencement of a recovery process. Inject debug interrupt signal 299 is merely an additional interrupt source for instruction scheduling logic 202, which has many interrupt sources. Instruction scheduling logic 202 services the inject debug interrupt using an interrupt vector table or other appropriate methods. Inject debug interrupt signal 299 is discussed further below in more detail with respect to FIG. 6.

Figure 3:
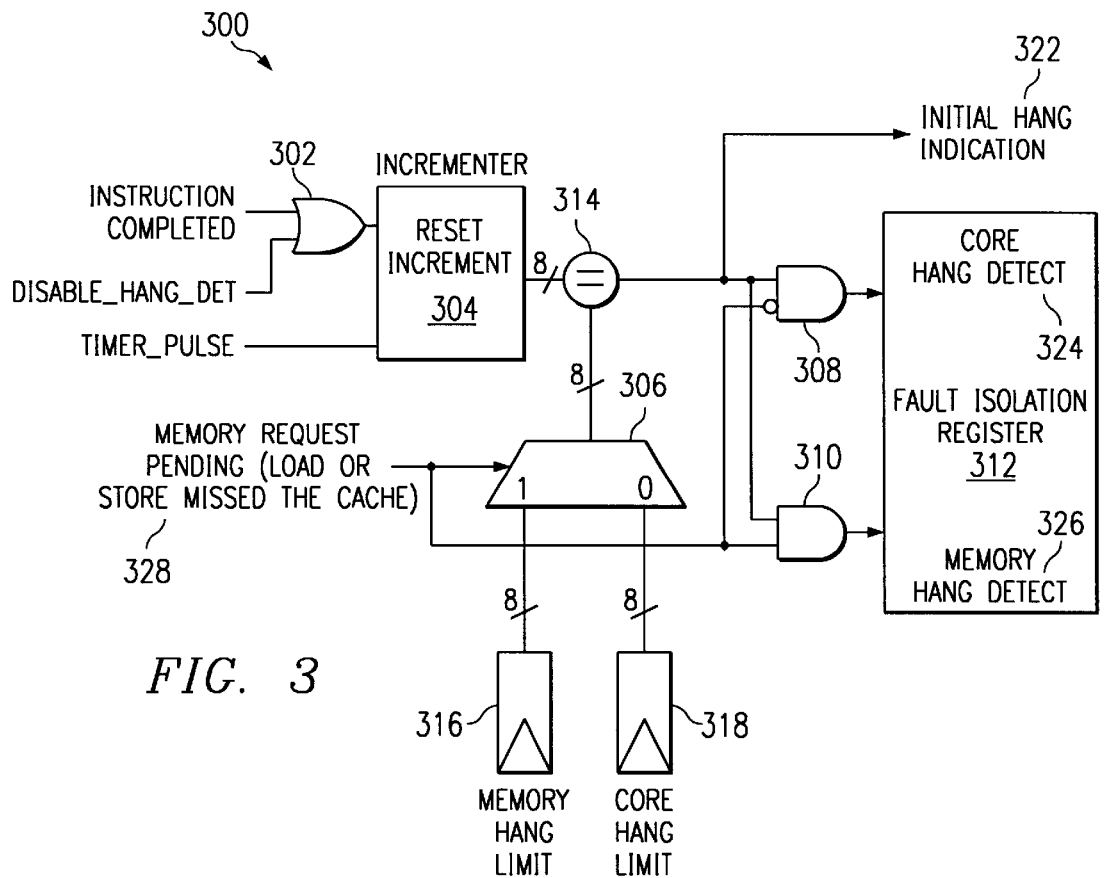
FIG. 3 is a block diagram of a core hang detect unit depicted in accordance with a preferred embodiment of the present invention.

With reference now to FIG. 3, a block diagram of a core hang detect unit is depicted in accordance with a preferred embodiment of the present invention. Core hang detect unit 300 is used to detect hang conditions and may be located in hang recovery logic 224 in FIG. 2. If a processor has not completed an instruction at the end of N timer pulses, core hang detect unit 300 will activate the core hang recovery logic. These timer pulses may be generated from a tunable source, such that hang core detect unit 300 is able to monitor for completion of instructions and indicate when an unacceptable amount of time has expired since the last instruction completion.

In this example, core hang detect unit 300 includes OR gate 302, incrementor 304, multiplexer 306, AND gate 308, and AND gate 310, fault isolation register 312, comparator 314, memory hang limit 316, and core hang limit 318. An instruction completed signal is received at OR gate 302. This instruction completed signal may be received from line 226 in FIG. 2. This signal is sent into incrementer 304 unless the function has been disabled by application of disable_hang_ det signal to OR gate 302. Incrementer 304 increments each time a signal, such as timer_pulse is applied to incrementer 304. The count contained in incrementer 304 is reset each time a logic 1 signal is received from OR gate 302. Incrementer 304 sends a value to comparator 314. The value from incrementer 304 is compared with a value received from multiplexer 306. The value output by multiplexer 306 may be memory hang limit 316 or core hang limit 318. Different limits are set to account for conditions in which an instruction requires accessing memory. Such a situation often takes more time than just executing an instruction. This limit is selectable to avoid falsely indicating a hang condition when memory is being accessed. If memory request pending signal 328 is a logic "1", memory hang limit 316 is selected. In this example, a pending memory request may be present when a load or store misses the cache in the processor core. Core hang limit 318 is selected when memory request pending signal 328 is a logic "0".

If the output from multiplexer 306 equals that of incrementer 304, an initial hang indication 322 is generated. In addition, the signal is sent to AND gate 308 and AND gate 310. These AND gates generate core detect indication 324 and memory hang detect indication 326, respectively. The AND gates are selectively enabled and disabled by memory request pending signal 328, which also is used to select a limit using multiplexer 306.

Figure 4:
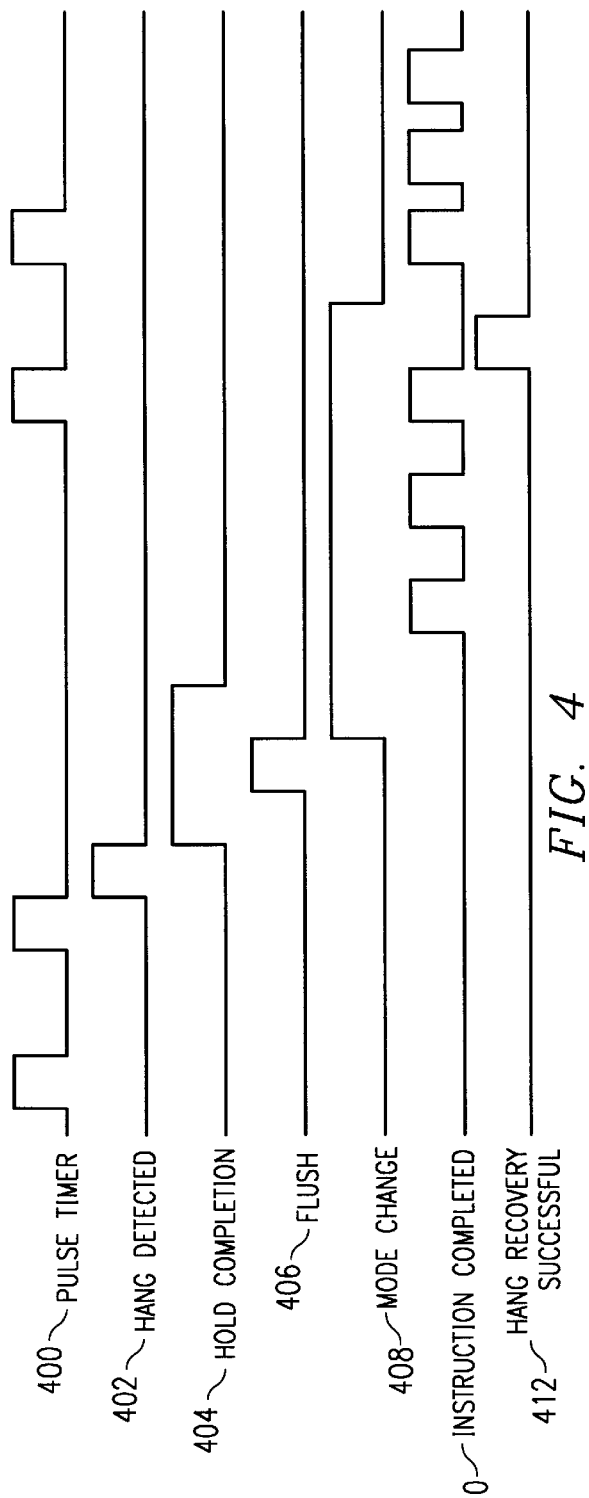
FIG. 4 is a timing diagram of a flush process depicted in accordance with a preferred embodiment of the present invention.

With reference now to FIG. 4, a timing diagram illustrating a flush process is depicted in accordance with a preferred embodiment of the present invention.

Pulse timer signal 400 illustrates the timer signal applied to incrementer 304 in FIG. 3. Hang detected signal 402 is a hang detect indication, such as core hang detect indication 324 or memory hang detect indication 326 in FIG. 3. A logic "1" in hang detected signal 402 indicates that a hang condition is present. Hold completion signal 404 is used to momentarily hold the dispatch of instructions and/or the completion of instructions during the flush operation in order to prevent confusing the instruction scheduling logic. This operation occurs when hold completion 404 is a logic "1". Hold completion signal 404 is communicated across line 230 in FIG. 2.

Flush signal 406 causes a flush process to occur when this signal is a logic "1". Flush signal 406 may be either a NTC flush or a NTC+1 flush depending on the situation. Mode change signal 408 is used to change the mode in which the processor executes instructions. This change in mode occurs when mode change signal 408 is a logic "1". In the depicted examples, three different types of mode changes may occur: a single scalar mode, a serial mode, and an in-order mode. The type of mode that occurs may be set by a mode bit within hang recovery logic 224 in FIG. 2. The signals are sent through lines 234, 236, and 238 in FIG. 2.

Single scalar mode causes the processor core to issue a single instruction for execution during each cycle when mode change signal 408 is a logic "1". This signal is used to avoid some types of problematic dependencies between instructions that occur at time of issue. In the serial mode, the processor executes and completes an instruction before issuing the next instruction. This mode is necessary to remove dependencies that occur while executing instructions at the same time. In the in-order mode, multiple instructions may be sent for execution, but the instructions are dispatched in order. This mode is used to avoid problems that arise with out of order issue of instructions. These different mode signals also may be set by a mode bit within hang recovery logic 224 in FIG. 2.

Instructions completed signal 410 is a logic "1" each time an instruction is completed. Hang recovery successful signal 412 is a logic "1" when a successful hang recovery has occurred. This signal is used as an internal indication to perform various actions within the hang recovery logic. Specifically, mode change signal 408 will not change to a logic "0" to return the processor to a normal mode until a successful hang recovery has occurred, as indicated by hang recovery successful signal 412. These actions are described in more detail below.

In the depicted examples, pulse timer signal 400 actually occurs at regular time intervals. A longer interval between pulses is present in order to illustrate other signals occurring between pulses in pulse timer signal 400. In other words, a change in scale is illustrated, rather than a change in the time between pulses in pulse timer signal 400. In these examples, hang recovery successful signal 412 occurs after a programmable number of bits have been successfully completed, as indicated by instruction completed signal 410. Although only a few timer pulses are shown before hang detected signal 402 generates a logic "1", many cycles may occur in actuality. Further, the number of instructions completed in the different modes may occur over many instruction completions depending on the implementation.

Figure 5:
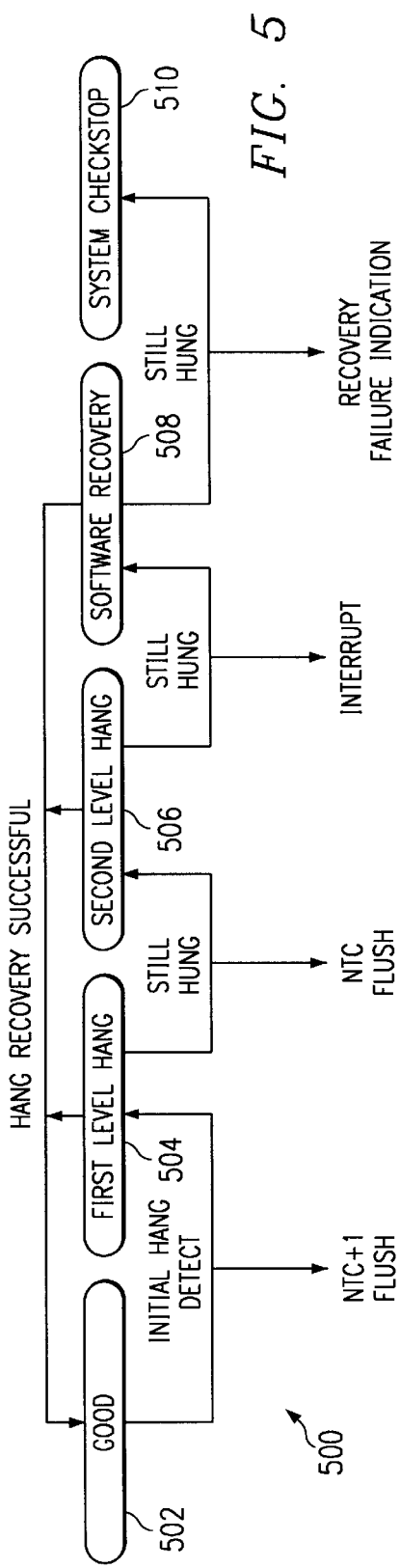
FIG. 5 is a state machine for a hang recovery logic unit depicted in accordance with a preferred embodiment of the present invention.

With reference now to FIG. 5, a state machine for a hang recovery logic unit is depicted in accordance with a preferred embodiment of the present invention. Once a processor hang has been detected, a flush (which causes an instruction cancel and refetch) may be attempted to clear the hang. Two levels of flushing are present in the present invention and implemented in state machine 500. The first level is also referred to as a low priority flush or a NTC+1. The second level, which is also called a high priority flush, is more aggressive and will flush the next to complete (NTC) group.

State machine 500 in this example begins in state 502, which indicates a good execution state. In this state, a hang condition has not been detected. In response to an initial hang detect, state machine 500 shifts to state 504, which is a first level hang state. In shifting to this state, a NTC+1 flush is sent to the instruction schedule logic. This mechanism is used to flush the next to complete group+1 (NTC+1). In other words, in NTC+1 all of the instructions behind the instruction that is trying to complete are flushed.

In the depicted examples, the processor is given a full hang limit duration in which to begin completing instructions again. In particular, a hang is considered recovered if a selected number of groups of instructions or instructions complete before the hang limit duration expires. If the hang condition goes away, as indicated by a hang recovery successful indication, state machine 500 returns to state 502. In returning to this state, the processor is returned to a normal processing mode if the mode was changed previously.

If a hang condition is still present, state machine 500 then shifts from state 504 to state 506, which is a second level hang state. In shifting to this state, a NTC flush is initiated. The NTC flush causes the instruction that is trying to complete to flush, as well as all of the instructions behind it. In other words, all of the instructions currently active in the processor are canceled in this case. The hang condition is considered recovered as described above.

If the hang condition clears, state machine 500 returns to state 502. The transition to state 502 is caused by a hang recovery successful indication. If a programmable number of instructions have completed since the transition to the state, then the hang has been successfully recovered from and a transition back to state 502 may occur. Upon transition back to state 502, the system is placed back into a full performance mode. If the programmable number of instructions have not completed and another timer pulse occurs, the system is still considered in a hang state.

On the other hand, if the hang condition persists, state machine 500 shifts to state 508, which is a software recovery state. In shifting to this state, an interrupt is produced to allow software intervention to clean up the hang condition. This software recovery may include, for example, terminating the process that contained the problem code stream that caused the hang without crashing the entire system. If the hang condition is cleared, the state machine returns to state 502. Otherwise, if the hang condition is still present, state machine 500 shifts to state 510, indicating that the hang recovery has failed, which is a system check stop state. In some cases the flushes may not be able to break the hang condition, but an interrupt may be able to break this condition and allow some form of software recovery.

Depending on the implementation, instead of shifting to state 506 from state 504, state machine 500 may shift directly to state 508 or state 510. Alternatively, a signal may be sent to request assistance from an external service processor in any of these states. In some cases the instruction scheduling logic is unable to perform a flush without corrupting the architected state of the processor. In such cases, the flush operation may be ignored by the instruction scheduling unit. In other implementations, the instructions scheduling unit may communicate to the hang recovery unit indicating when it is safe or not safe to perform the flush operations.

Figure 6:
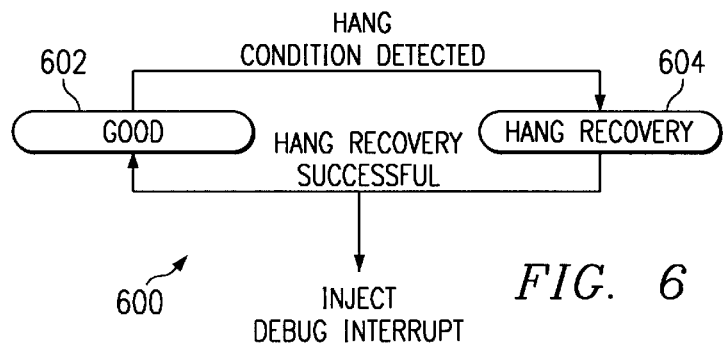
FIG. 6 is a state machine for a hang recovery logic unit with injection of debug interrupt depicted in accordance with a preferred embodiment of the present invention.

With reference now to FIG. 6, a state machine for a hang recovery logic unit with debug interrupt is depicted in accordance with a preferred embodiment of the present invention.

State machine 600 in this example begins in state 602, which indicates a good execution state. In this state, a hang condition has not been detected. In response to an initial hang detect, state machine 600 shifts to state 604, which is a hang recovery state. Once a processor hang has been detected, a flush (which causes an instruction cancel and refetch) may be attempted to clear the hang. Alternatively, some other hang recovery process may be initiated. If the hang condition is cleared, the state machine returns to state 602. However, the hang recovery logic also requests the injection of a debug interrupt that pops the execution flow to an interrupt handler before the execution environment is altered by the resumption of execution.

Referring again to FIG. 2, after the hang recovery logic has successfully detected a hang condition and started the recovery process so that the instruction scheduling logic may commence with normal execution of instructions, as explained with respect to FIGS. 2–5, the hang recovery logic may send a debug interrupt signal, such as inject debug interrupt signal 299 in FIG. 2, to the instruction scheduling logic to inject an interrupt. The processor then immediately takes an interrupt vector that provides the ability of software to analyze or gather information concerning the hang state.

The use of interrupt vectors is well-known. The current program counter or current instruction address is generally saved in a special location, such as the system stack or a save-and-restore register, and the processor jumps to an address specified by the interrupt vector. Generally, an interrupt handler is located at the starting address, and the interrupt handler performs the necessary processing for servicing the interrupt. After the interrupt is serviced and cleared, the interrupt service routine returns, and the processor begins processing instructions at the location that was previously saved.

However, in the present invention, a special debug interrupt is injected and a debug interrupt handler is invoked. By directing the hang recovery to go to a unique interrupt vector at the exact point of failure, the processor can break itself out of the hang state and immediately collect the failing instruction stream or code stream.

The most important information about the hang state may be the failing instruction stream. The saved, current instruction address can be used to retrieve the immediately preceding instructions. However, a simple backtracking through memory may have limited usefulness as the current instruction address may have been reached by a call from a routine which is located in memory that is physically separated from the instructions that were executed just prior to entering the hang state. Even if the entire instruction stream which caused the hang state is located near the memory address specified by the program counter or similar register, the entire context of the execution environment that caused the hang state may need to be analyzed before the root of the problem may be discovered.

Figure 7:
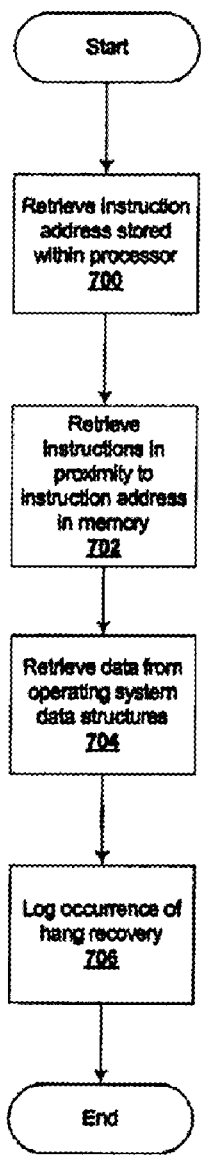
Figure 1:
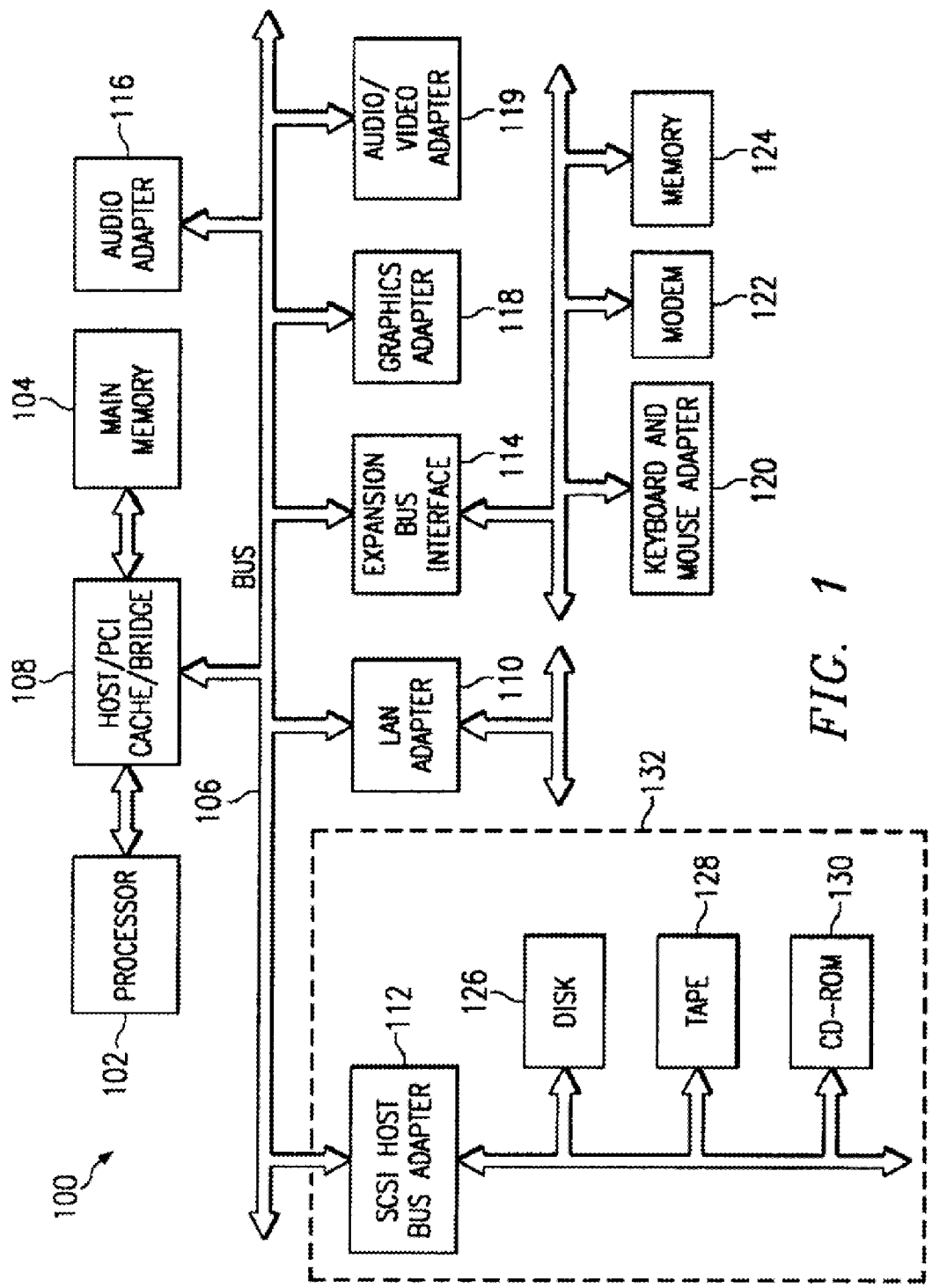
Figure 2:
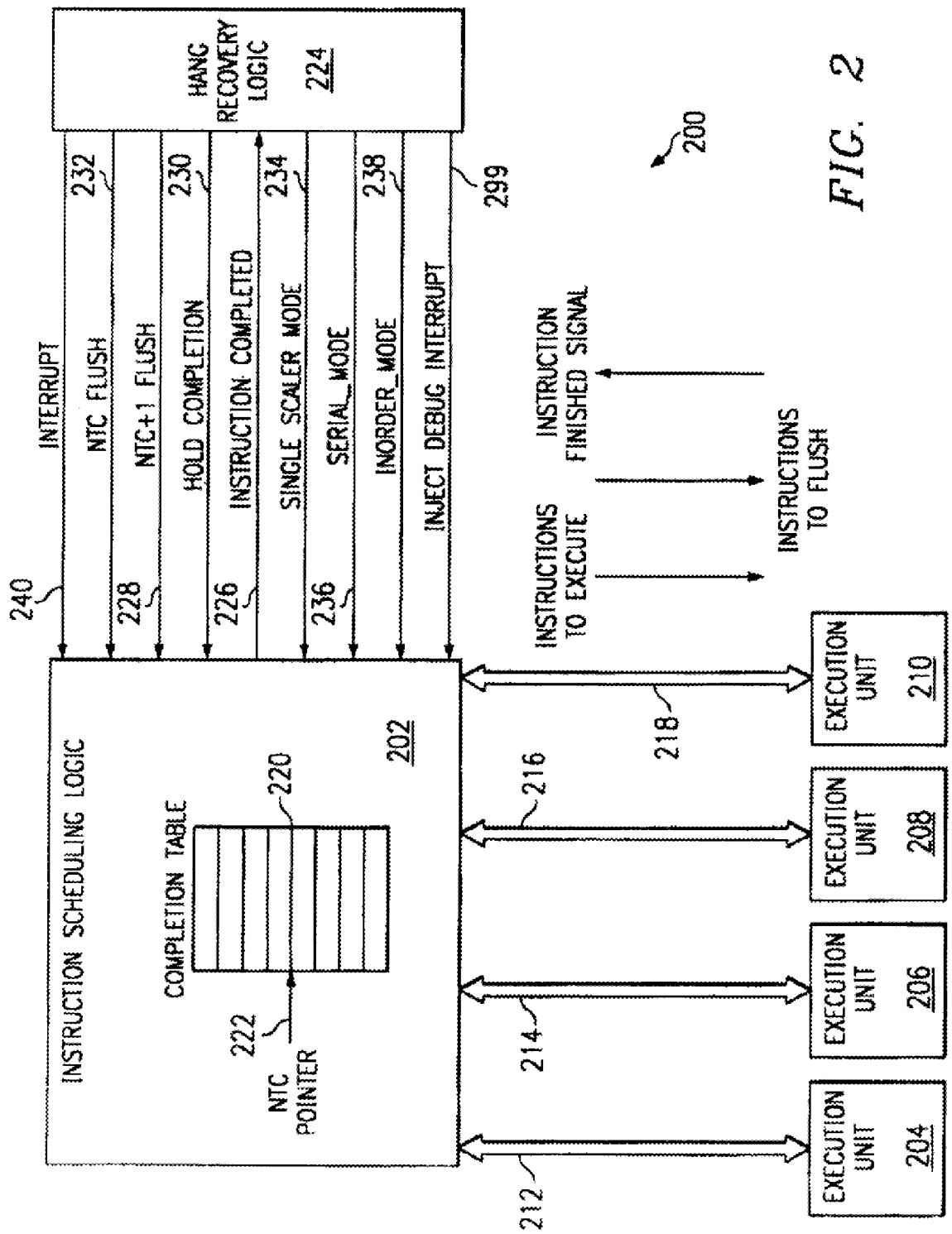
Figure 3:
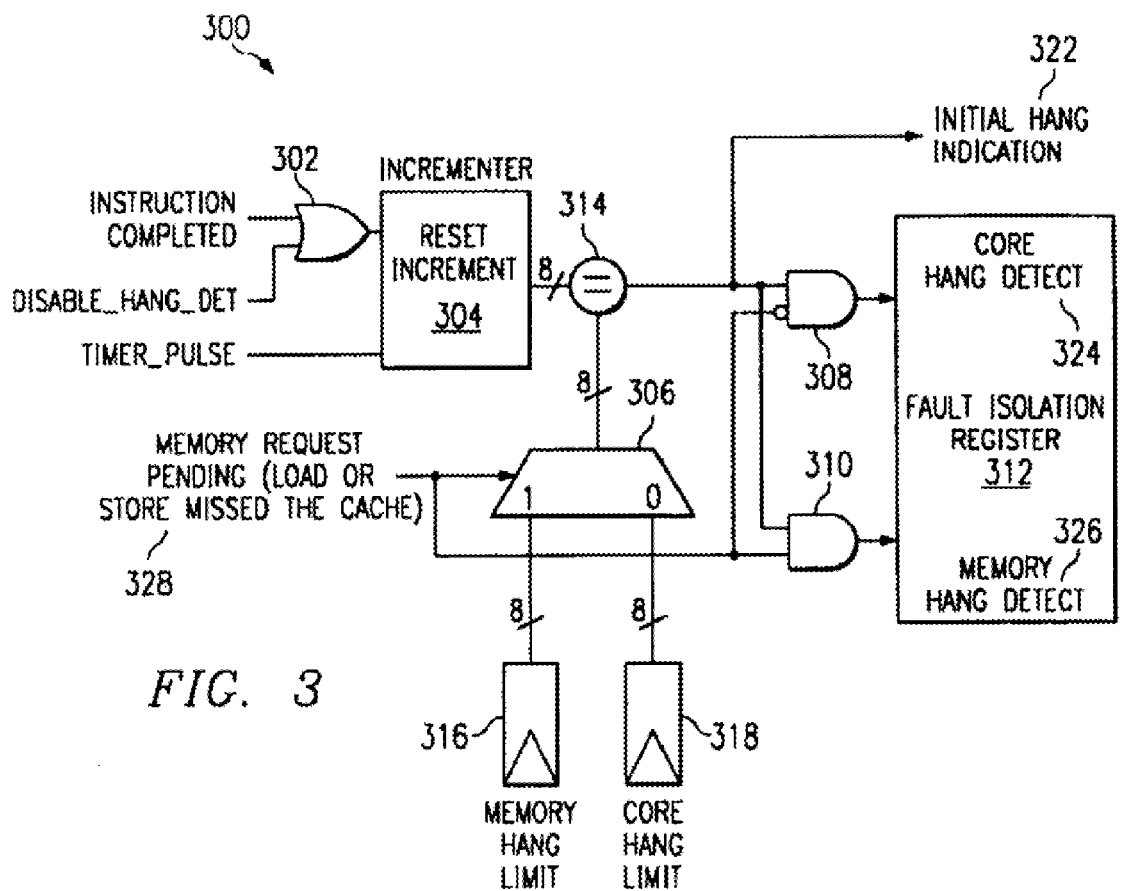
Figure 6:
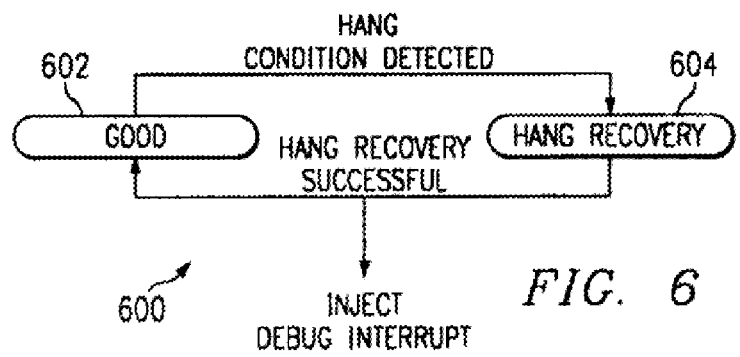
Figure 4:
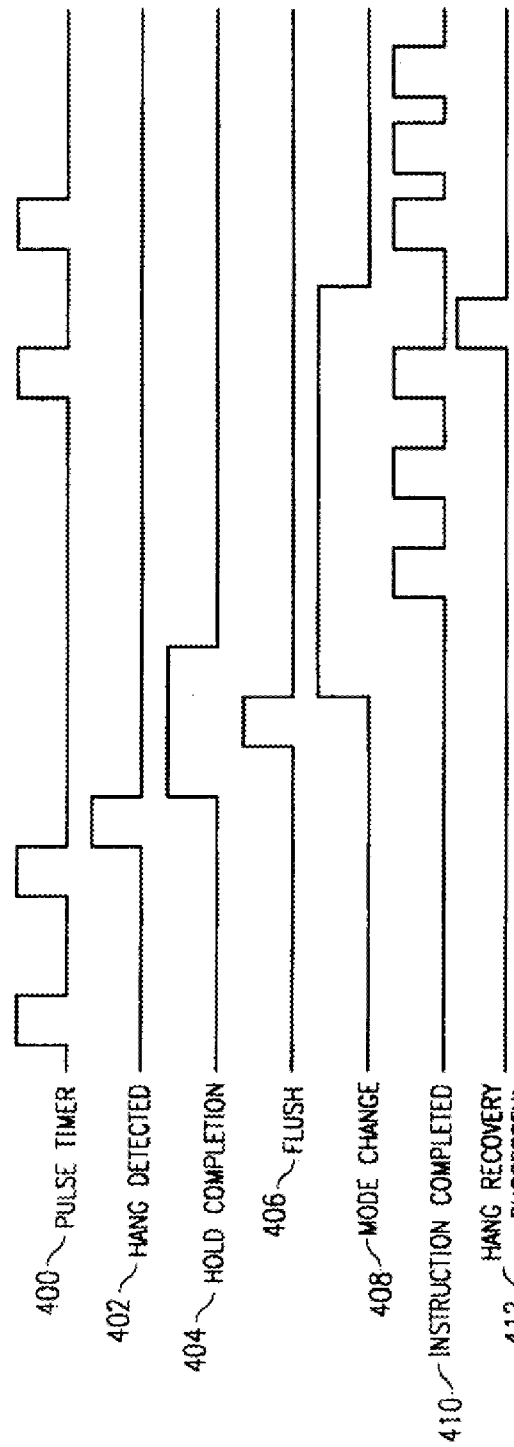
Figure 5:
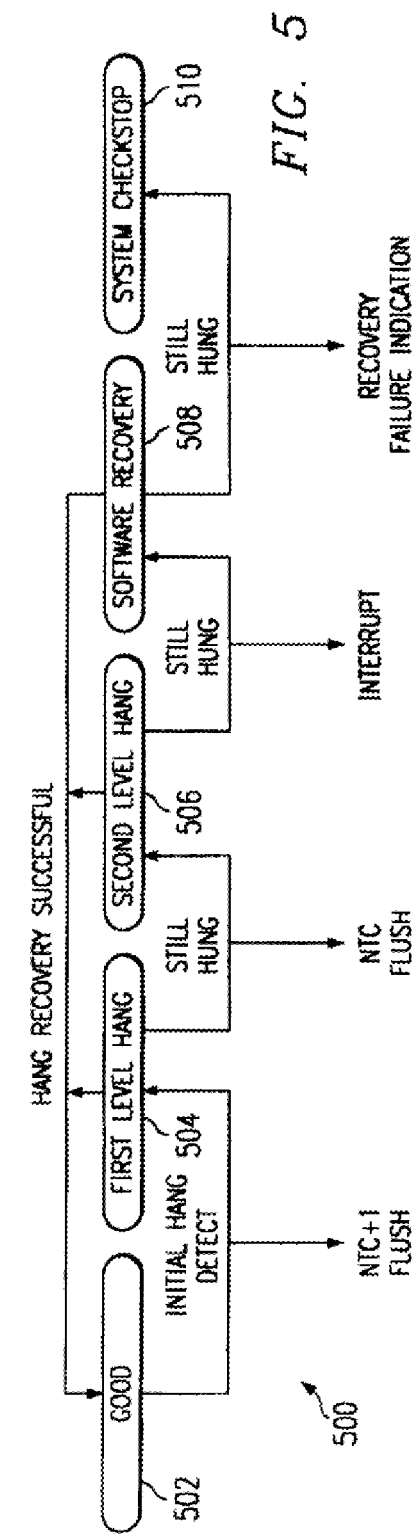
Figure 7:
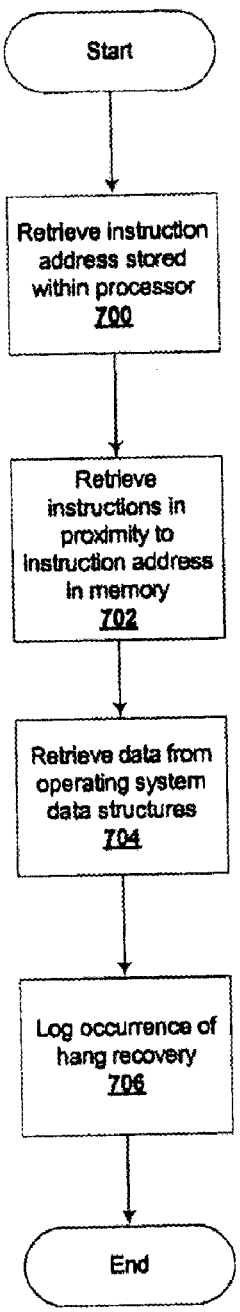

With the present invention, when the debug interrupt routine obtains execution control, all of the system-related information at the time of the occurrence of the hand state is in a pristine, undisturbed state. Hence, the present invention provides the ability to "harvest" problematic code sections, as shown in FIG. 7. In this context, harvesting a code section means locating, retrieving, and storing information related to a set of instructions. For example, in step 700 of FIG. 7, an instruction address stored within the processor is retrieved. Instructions located in proximity to the retrieved instruction address may then be retrieved (step 702). Operating system data structures may be accessed along with the location of the problematic code (step 704). In short, any type of diagnostic information which may be necessary to diagnosing the cause of the hang condition may be gathered for real-time or post-processing analysis. The hang recovery occurrence can then be logged (step 706).

By gathering operating system data structures, such as the call stack frames, any address translations required for tracing back through several layers of function calls may be performed. In addition, data structures related to process or thread switch may be accessed and retrieved in order to check whether the processing context was switched immediately before the hang state occurred. Data structures relating to the address space, kernel, and virtual memory may also be retrieved. For example, page table entries may be examined to check whether the instruction stream had encountered a-page fault just prior to the hang state.

For example, an instruction stream may have entered a hang state because the instructions accessed memory across a page boundary, and the processor may have an error in the manner in which it processes load and/or store instructions in such instances.

After the instruction stream is harvested, it may be logged for subsequent analysis by design engineers to determine what type of hardware error may exist in the processor design. Assuming hang recovery was successful, the entire hang recovery process may be transparent to the user as the user of the system, the system software, or the application software may not notice a pause in processing, since the hang detection, recovery, and harvesting process may be on the order of microseconds or milliseconds.

Thus, the present invention provides a method and apparatus for recovering from hang conditions in a processor. For example, a mechanism may initiate a flush of the instructions being processed within the processor core. This flush causes instructions to be canceled, which may free internal resources or otherwise clear contention among instructions that caused an execution unit to stop processing instructions. Prior to allowing the processor to begin full execution of instructions, a special debug interrupt is injected that allows a debug interrupt handler to gather information concerning the context in which the hang condition occurred, such as harvesting the code sections that executed immediately before the hang condition occurred. This information may then be diagnostically analyzed to determine a hardware design error or flaw that may be corrected to prevent the hang condition from occurring.

It is important to note that while the present invention has been described in the context of a fully functioning data processing system, those of ordinary skill in the art will appreciate that the processes of the present invention are capable of being distributed in the form of a computer readable medium of instructions, including microcode, and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

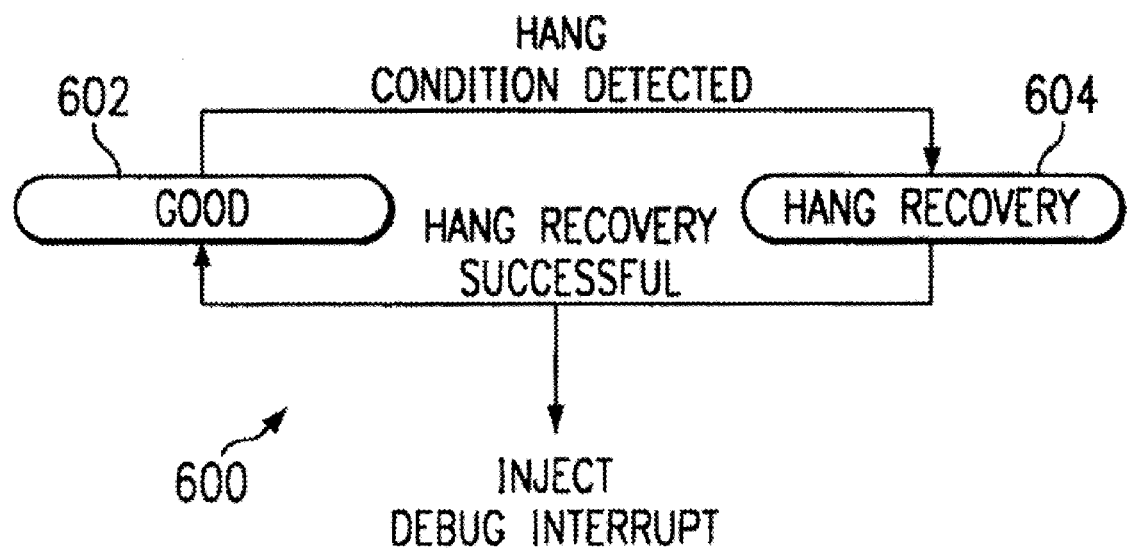

What is claimed is:

1. A method for processing instructions in a processor having a plurality of execution units, the method comprising:

monitoring for a hang condition, wherein the hang condition is caused by a hardware error;

responsive to detecting a hang condition, attempting to recover from the hang condition;

responsive to a determination of a successful hang condition recovery, generating a processor interrupt request from within the processor; and responsive to the interrupt request, causing a processor interrupt.

2. The method of claim 1 wherein the processor interrupt request is an interrupt signal.

3. The method of claim 2 further comprising:

sending an interrupt signal from a first unit to a second internal processor unit, wherein the first unit and the second unit are internal to the processor.

4. The method of claim 3 further comprising:

performing hang recovery from a third unit, wherein the third unit is internal to the processor.

5. The method of claim 1, wherein the step of monitoring for a hang condition further comprises:

determining whether a selected period of time has passed without an instruction being completed by the plurality of execution units.

6. The method of claim 1 wherein the step of recovering from the hang condition further comprises:

flushing instructions dispatched to the plurality of execution units.

7. The method of claim 1 further comprising:

invoking an interrupt handler to service the processor interrupt; and retrieving information related to the hang condition.

8. The method of claim 7 wherein the step of retrieving further comprises:

harvesting a code section comprising instructions that executed immediately prior to detection of the hang condition.

9. The method of claim 8 wherein the step of harvesting further comprises:

reading an instruction address stored within the processor; and retrieving instructions in proximity to the instruction address in memory.

10. The method of claim 7 further comprising:

retrieving data from operating system data instructions associated with an execution environment of the processor.

11. The method of claim 7 further comprising:

logging an occurrence of a hang recovery.

12. A processor comprising:

a plurality of execution units;

an instruction scheduling unit connected to the plurality of execution units, wherein the instruction scheduling unit sends instructions to the plurality of execution units for processing; and a hang recovery unit connected to the instruction scheduling unit, wherein the hang recovery unit monitors for completion of instructions by the plurality of execution units, initiates a hang recovery process in response to an absence of a completion in processing of instructions by the plurality of execution units within a period of time, and requests a processor interrupt from the instruction scheduling unit in response to a successful hang recovery process.

13. The processor of claim 12, wherein the instruction scheduling unit receives signals indicating completion of processing by the plurality of execution units, wherein the instruction scheduling unit sends a completion signal to the hang recovery unit each time an instruction is completed by the plurality of execution units, and wherein the hang recovery unit monitors for completion of instructions by waiting for the completion signal from the instruction scheduling unit.

14. An apparatus for processing instructions in a processor having a plurality of execution units, the apparatus comprising:

monitoring means for monitoring for a hang condition, wherein the hang condition is caused by a hardware error;

recovery means for attempting to recover from the hang condition in response to detecting a hang condition;

generating means for generating, in response to a determination of a successful hang condition recovery, a processor interrupt request from within the processor; and interrupting means for interrupting the processor in response to the interrupt request.

15. The apparatus of claim 14 wherein the processor interrupt request is an interrupt signal.

16. The apparatus of claim 15 further comprising:

sending means for sending an interrupt signal from a first unit to a second internal processor unit, wherein the first unit and the second unit are internal to the processor.

17. The apparatus of claim 16 further comprising:

performing means for performing hang recovery from a third unit, wherein the third unit is internal to the processor.

18. The apparatus of claim 14, wherein the monitoring means for monitoring for a hang condition further comprises:

determining whether a selected period of time has passed without an instruction being connected by the plurality of execution units.

19. The apparatus of claim 14 wherein the recovering means for recovering from the hang condition further comprises:

flushing instructions dispatched to the plurality of execution units.

20. The apparatus of claim 14 further comprising:

invoking means for invoking an interrupt handler to service the processor interrupt; and first retrieving means for retrieving information related to the hang condition.

21. The apparatus of claim 20 wherein the retrieving means for retrieving further comprises:

harvesting means for harvesting a code section comprising instructions that executed immediately prior to detection of the hang condition.

22. The apparatus of claim 21 wherein the harvesting means for harvesting further comprises:

reading means for reading an instruction address stored within the processor; and second retrieving means for retrieving instructions in proximity to the instruction address in memory.

23. The apparatus of claim 20 further comprising:

third retrieving means for retrieving data from the operating system data structures associated with an execution environment of the processor.

24. The apparatus of claim 20 further comprising:

logging means for logging an occurrence of hang recovery.

25. A computer program product in a computer-readable medium for processing instructions in a processor having a plurality of execution units, tile computer program product comprising:

instructions for monitoring for a hang condition, wherein the hang condition is caused by a hardware error;

instructions for attempting, in response to detecting a hang condition, to recover from the hang condition;

instructions for generating, in response to a determination of a successful hang condition recovery, a processor interrupt request from within the processor; and instructions for causing a processor interrupt in response to the interrupt request.

26. The computer program product of claim 25 wherein the processor interrupt request is an interrupt signal.

27. The computer program product of claim 26 further comprising:

instructions for sending an interrupt signal from a first unit to a second internal processor unit, wherein the first unit and the second unit are internal to the processor.

28. The computer program product of claim 27 further comprising:

performing means for performing hang recovery from a third unit, wherein the third unit is internal to the processor.

29. The computer program product of claim 25 further comprising:

instructions for invoking an interrupt handler to service the processor interrupt; and instructions for retrieving information related to the hang condition.

30. The computer program product of claim 29 wherein the step of retrieving further comprises:

instructions for harvesting a code section comprising instructions that executed immediately prior to detection of the hang condition.

* * * * *

UNITED STATES PATENT AND TRADEMARK OFFICE
CERTIFICATE OF CORRECTION

PATENT NO. : 6,745,321 B1
APPLICATION NO. : 09/436104
DATED : June 1, 2004
INVENTOR(S) : Floyd et al.

It is certified that error appears in the above-identified patent and that said Letters Patent is hereby corrected as shown below:

Please insert the attached Figure 7.

Col. 2, line 61: after "present invention." insert a return and add the following paragraph: --FIG. 7 is a flowchart of a process for harvesting problematic code sections in accordance with a preferred embodiment of the present invention;--.

Col. 3, line 30: after "Interactive" delete "executive" and insert --eXecutive--.

Col. 12, line 22: after "being" delete "connected" and insert --completed--.

Col. 12, line 50: after "of" insert --a--.

Col. 12, line 54: after "units," delete "tile" and insert --the--.

Signed and Sealed this

Eighth Day of July, 2008

JON W. DUDAS
*Director of the United States Patent and Trademark Office*

Floyd et al.
AT9-99-768
Method and Apparatus for Harvesting Problematic Code
Sections Aggravating Hardware Design Flaws in a
Microprocessor

UNITED STATES PATENT AND TRADEMARK OFFICE
CERTIFICATE OF CORRECTION

PATENT NO. : 6,745,321 B1
APPLICATION NO. : 09/436104
DATED : June 1, 2004
INVENTOR(S) : Floyd et al.

It is certified that error appears in the above-identified patent and that said Letters Patent is hereby corrected as shown below:

Delete the title page and substitute therefor the attached title page.

Delete Drawing Sheets 1-4 and substitute therefor the attached Drawing Sheets 1-5.

Col. 2, line 61: after "present invention." insert a return and add the following paragraph: --FIG. 7 is a flowchart of a process for harvesting problematic code sections in accordance with a preferred embodiment of the present invention;--.

Col. 3, line 30: after "Interactive" delete "executive" and insert --eXecutive--.

Col. 12, line 22: after "being" delete "connected" and insert --completed--.

Col. 12, line 50: after "of" insert --a--.

Col. 12, line 54: after "units," delete "tile" and insert --the--.

This certificate supersedes the Certificate of Correction issued July 8, 2008.

Signed and Sealed this

Twelfth Day of August, 2008

JON W. DUDAS
*Director of the United States Patent and Trademark Office*

United States Patent
Floyd et al.

(10) Patent No.: US 6,745,321 B1
(45) Date of Patent: Jun. 1, 2004

(54) METHOD AND APPARATUS FOR HARVESTING PROBLEMATIC CODE SECTIONS AGGRAVATING HARDWARE DESIGN FLAWS IN A MICROPROCESSOR

(75) Inventors: Michael Stephen Floyd, Leander, TX (US); Kevin Franklin Reick, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/436,104

(22) Filed: Nov. 8, 1999

(51) Int. Cl.$^7$ .................................................. G06F 11/22
(52) U.S. Cl. ........................... 712/227; 714/45; 714/39; 710/267
(58) Field of Search ............................ 714/51, 45, 39; 712/228, 227, 219; 710/267

(56) References Cited

U.S. PATENT DOCUMENTS

| | | | |
|---|---|---|---|
| 3,518,413 A | * 6/1970 | Holley | 714/51 |
| 3,566,368 A | * 2/1971 | De Blauw | 714/51 |
| 5,448,705 A | * 9/1995 | Nguyen et al. | 712/228 |
| 5,560,033 A | * 9/1996 | Doherty et al. | 713/340 |
| 5,668,815 A | * 9/1997 | Gittinger et al. | 714/720 |
| 5,701,516 A | * 12/1997 | Cheng et al. | 710/22 |
| 5,790,530 A | * 8/1998 | Moh et al. | 370/363 |
| 6,289,478 B1 | * 7/2001 | Lautenbach-Lampe et al. | 717/127 |
| 6,539,500 B1 | * 3/2003 | Kahle et al. | 714/45 |

OTHER PUBLICATIONS

Hennessy, John L. and David A. Patterson, Computer Architecture A Quantitative Approach, 1996, Morgan Kaufmann Publishers, Inc., 2nd Ed., pp. 179–184.*

* cited by examiner

Primary Examiner—Richard L. Ellis
Assistant Examiner—Tonia L. Meonske
(74) Attorney, Agent, or Firm—Duke W. Yee; Volel Emile; Stephen J. Walder, Jr.

(57) ABSTRACT

A method and apparatus for harvesting problematic code sections that may cause a hang condition based on a hardware design flaw is presented. Monitoring is performed to detect a hang condition. Responsive to detecting a hang condition, steps are employed by hardware and/or software to recover from a hang condition, such as flushing instructions dispatched to the plurality of execution units. Upon successful completion of hang recovery, a debug interrupt is injected, causing a debug interrupt handler to be immediately invoked before the resumption of normal execution. The debug interrupt handler may then harvest problematic code sections in the undisturbed execution error that may have caused the hang condition.

30 Claims, 5 Drawing Sheets